United States Patent [19]

Beck

[11] Patent Number: 4,780,029
[45] Date of Patent: Oct. 25, 1988

[54] ADJUSTABLE TOOL HOLDER

[75] Inventor: Hans W. Beck, Sinsheim, Fed. Rep. of Germany

[73] Assignee: GTE Valeron Corporation, Troy, Mich.

[21] Appl. No.: 828,583

[22] Filed: Feb. 10, 1986

Related U.S. Application Data

[63] Continuation of Ser. No. 600,567, Apr. 17, 1984, abandoned.

[30] Foreign Application Priority Data

Apr. 19, 1983 [DE] Fed. Rep. of Germany ....... 3314126

[51] Int. Cl.$^4$ .............................................. B23P 15/28
[52] U.S. Cl. ........................................ 407/89; 407/77; 407/87; 407/90; 408/156; 408/714
[58] Field of Search .......................... 407/840, 74–76, 407/81–89, 77, 90; 408/153–156, 181, 185, 714; 82/36 R

[56] References Cited

U.S. PATENT DOCUMENTS

| | | | |
|---|---|---|---|
| 1,416,832 | 5/1922 | Johansson | 407/10 |
| 2,190,492 | 2/1940 | Staples | 408/156 |
| 2,266,339 | 12/1941 | Shutz | 408/156 |
| 2,753,617 | 7/1956 | Felenchak | 407/10 |
| 3,097,548 | 7/1963 | Johnson | 408/156 |
| 3,190,152 | 6/1965 | Werth | 408/16 |
| 3,282,133 | 11/1966 | Dickinson et al. | 408/156 |
| 3,523,349 | 8/1970 | Pollington et al. | 407/9 |
| 4,328,723 | 5/1982 | Garnett | 82/36 R |
| 4,351,207 | 9/1982 | Werth | 407/10 |
| 4,428,704 | 1/1984 | Kalokhe | 407/89 |

FOREIGN PATENT DOCUMENTS 1303389 7/1962 France ................................ 407/81

Primary Examiner—Frederick R. Schmidt
Assistant Examiner—Robert Showalter
Attorney, Agent, or Firm—David J. Koris

[57] ABSTRACT

A tool holder for a numerically controlled machine tool, in which a cutting edge provided on a base member is adjustable with respect to a reference surface on the base member by adjustment means. The adjustment means comprise a U-shaped slot in the base member. This slot serves to form a pair of lever portions in the material of the base member, which lever portions are connected to each other by an area of the base member serving as a pivot. An adjustment screw threadingly engaging the base member acts upon the free end of one of said lever portions such that upon an adjusting movement of the adjustment screw the first lever portion is deflected in a predetermined direction to thereby deflect the second lever portion of the opposite direction. The second lever portion transmits its movement to the cutting edge by means of a spacing member disposed in the slot (FIG. 1).

13 Claims, 1 Drawing Sheet

ADJUSTABLE TOOL HOLDER

This application is a continuation of application Ser. No. 600,567, filed Apr. 17, 1984 now abondoned, claiming priority from German Pat. No. P33 14 126.6, filed Apr. 19, 1983.

BACKGROUND OF THE INVENTION

This invention relates to a tool holder for a numerically controlled machine tool, comprising a base member, a cutting member mounted on the base member and adjustment means for adjusting a cutting edge of the cutting member relative to a reference surface on the base member.

DISCUSSION OF THE PRIOR ART

Tool holders of this type are use for example in boring bars for numerically controlled machine tools, in which a displacement of the cutting edge relative to a desired position is inductively sensed and automatically compensated by the adjusting means (see German Pat. No. 29 22 155). In this connection it is important that the adjusting means are continuously adjustable high precision adjusting means. In particular, an adjustment in the range of a few microns should be possible.

There are prior art adjusting means complying with these requirement.s However, such adjusting means generally are of relatively high expenditure (requiring a comparatively large number of components). This means not only high costs but also makes the tool holder unreliable and sensitive to vibrations.

SUMMARY OF THE INVENTION

It is an object of the present invention to provide a tool holder allowing an extremely precise adjustment of the cutting edge while being characterized by an extremely simple structure resulting in a correspondingly high reliability.

According to the present invention, the adjusting means comprise a first lever portion formed by a slot in the material of the base member, the free end of the lever portion being deflectable by an adjusting member supported in the base member and the other end thereof being connected to an area of the base member forming a second lever portion such that upon a deflection of the first lever portion in a predetermined direction the second lever portion is deflected in the opposite direction to thereby adjust the cutting edge.

With the tool holder of the present application, the adjusting means are, so to say, formed by the material of the base member itself. This is why no additional components—apart from the adjusting member—are required. The tool holder of the present invention is characterized by a great structural simplicity. This results in low sensitivity to vibrations, high functional reliability as well as long life. Yet, the adjusting means are extremely high precision tooling allowing for adjustments in the range of only a few microns.

It should be noted that the adjusting member may be adjusted not only automatically but also manually. Furthermore, the tool holder may be used in connection with tools other than boring bars.

BRIEF DESCRIPTION OF THE DRAWINGS

An embodiment of the present application will be explained in further detail with reference to the accompanying drawings. In the drawing.

FIG. 4 is a side elevation of an alternate embodiment.

DETAILED DESCRIPTION

Figure 2:
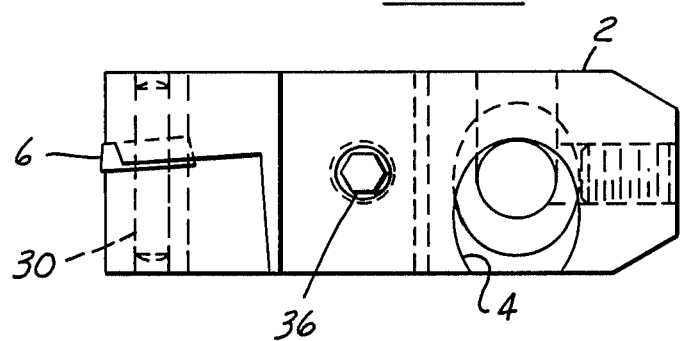
FIG. 2 is a plan view of the tool holder as shown in FIG. 1.

The tool holder shown in the drawing is used as a removable cartridge 1 in a boring bar (not shown). To this end, a substantially rectangularly shaped base member 2 of the tool holder is provided with an inclined bore 4 (see FIG. 2) serving to mount the base member 2 to the boring bar.

An indexable cutting insert 6 is clamped to the end of the base member 2 remote from the boring bar by means of a clamping screw 8. The cutting insert 6 has an active cutting edge 10 which, in operation, is intended to be in a desired position relative to a reference surface 12 at the base member 2.

Any deviation of the desired position of the cutting edge 10 from reference surface 12 is—e.g. inductively—sensed and automatically compensated for by adjusting means 14 to be described.

Figure 3:
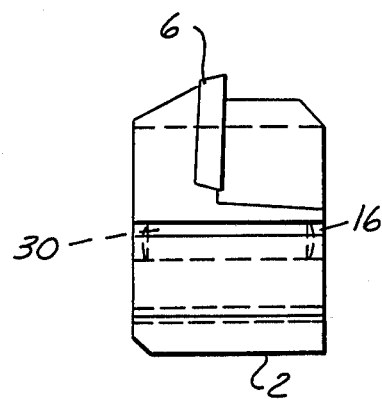
FIG. 3 is a front view of the tool holder shown in FIG. 1.

The adjusting means 14 comprise a substantially U-shaped slot 16 formed in the material of the base member 2, which slot extends across the whole width of base member 2 (see FIG. 3). Slot 16 comprises a substantially horizontally extending, centrally disposed first leg 18 and a second leg 20 inclined thereto to a certain extent and disposed below first leg 18; the two legs 18, 20 are connected to each other by an arcuate portion of the slot.

First leg 18 of slot 16 extends to the front face of base member 2, while second leg 20 ends short of the outer surface of base member 2 in the material of the base member. As a result thereof, a first lever portion 22 is provided between the two legs 18, 20 of slot 16 in the material of base member 2; first lever portion 22 at its one end merges into a second lever portion 26. The area of base member 2 between the left end (in FIG. 1) of second leg 20 and the outer surface of base member 2 forms some kind of a pivot 24 for pivoting the two lever portions 22 and 26.

A spacing member shaped as a pin 30 is disposed within first leg 18 of slot 16 at the area of the second lever portion 26. Pin 30 extends horizontally and perpendicularly to leg 18 and connects second lever portion 26 to an area of base member 2 above leg 18.

In the embodiment as shown the end of leg 18 extending to the outer surface is sealingly closed by a plastics 32, e.g. silastene. The free end of second leg 2 of slot 16 terminates in a circular hole 34.

Slot 16 may be manufactured by any suitable method e.g. by spark machining. An adjusting member formed as an adjustment screw 36 engages the free end of first lever portion 22; adjustment screw 36 is received in a threaded bore in the material of base member 2 above slot 16 and extends perpendicularly with respect to the horizontal leg 18 of slot 16. A ball 38 is inserted in the front end of adjustment screw 36 to transmit forces between adjustment screw 36 and lever portion 22.

Operation of the tool holder as described is as follows: In operation, any deviation between the desired position of cutting edge 10 and reference surface 12 is sensed by an inductive sensor means (not shown). The adjustment screw 36 is power adjusted in response to the sensed deviation. If adjustment screw 36 is moved downwards (in FIG. 1), the lever portion 22 is deflected downwards.

Figure 1:
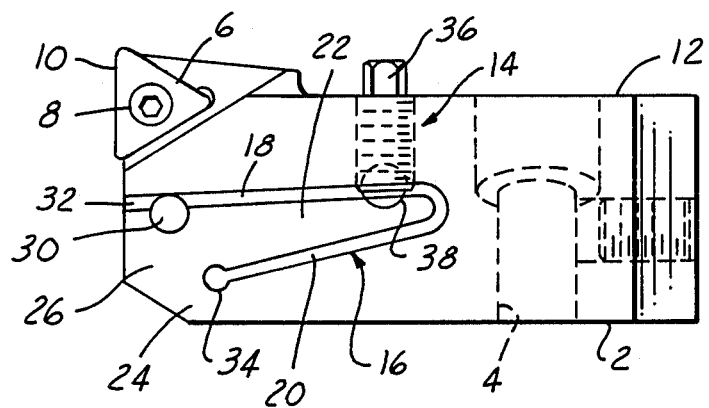
FIG. 1 is a side elevation of a tool holder for a boring bar.

This results in a corresponding deflection of second lever portion 26 in the opposite direction, i.e. upwards (in FIG. 1). This movement is transmitted by pin 30 to an area of base member 2 carrying cutting insert 6 and accordingly to cutting edge 10.

The length of first lever portion 22 is chosen about 4 to 5 times that of second lever portion 26 (even though the leverage should not be restricted to this value). This allows for an extremely precise, practically continuous adjustment of cutting edge 10. Adjustments in the range of only a few microns or even less are possible.

Deflecting movement of the lever portions is limited by first lever portion 22 engaging the opposite wall of leg 20 of slot 16 when moving downwards (in FIG. 1). As may be readily seen, resetting is enabled by simply displacing adjustment screw 36 upwards (in FIG. 1) while making use of the inherent resiliency of the material of base member 2.

In an alternative embodiment of the invention first leg 18 of slot 16 does not extend to the outer surface of base member 2; rather, its ends short of the outer surface such that the outer end of leg 18 of slot 16 is closed by material of base member 2. In this case no spacing member 30 and no separate sealing of slot 16 are required. Force transmittance between second lever portion 26 and that part of base member 2 which carries cutting insert 6 is achieved by the material of the base member itself.

I claim:

1. A rotatable tool holder having a central axis comprising:
    a base member having a cutting member mounted thereto at one end and a reference surface, and
    means for adjusting said cutting member in relation to said reference surface, said adjustment means comprising:
    a first lever member formed by a substantially U-shaped slot in said base member,
    said first lever having a first free end and a second fixed end,
    a second lever formed by material of said base member adjoining said first lever at said second end,
    an adjusting member threadingly supported in said base member and positioned to deflect said first end in a predetermined direction such that said adjoining second lever is deflected in an opposite direction to thereby effect cutting member adjustment.

2. Tool holder of claim 1 wherein said U-shaped slot comprises a first leg which extends to the outer surface of the base member and includes a spacing member disposed in said slot, and a second leg which ends short of the outer surface of the material of the base member such as to form a pivot between said lever portions.

3. Tool holder of claim 2 wherein said first leg of said slot extends substantially parallel to said central axis of the tool holder and said second leg is inclined thereto to a certain extent.

4. Tool holder of claim 3 wherein said adjusting member extends perpendicularly to said first leg.

5. The tool holder of claim 4 wherein said second leg of said slot terminates in a circular hole.

6. The tool holder of claim 5 wherein said spacing member is formed as a pin.

7. The tool holder of claim 6 wherein said spacing member is disposed in said slot at the area of the end of said first leg which extends to the outer surface, which spacing member upon a deflection of the first lever portion transmits movement of the second lever portion to an area of the base member carrying the cutting edge.

8. The tool holder of claim 7, wherein said first lever portion has a length approximately 4 to 5 times the length of the second lever.

9. The tool holder of claim 8 wherein said adjusting member is an adjustment screw.

10. The tool holder of claim 9 wherein said adjusting member acts upon said first lever portion via a ball.

11. The tool holder of claim 10 wherein said cutting member comprises an indexable cutting insert.

12. The tool holder of claim 1 wherein both legs of the U-shaped slot end short of the outer surface of the material of the base member.

13. The tool holder of claim 1 wherein said end of said first leg which extends to the outer surface of the base member is closed by sealing means.

* * * * *